US007483989B2

(12) United States Patent
Williams et al.

(10) Patent No.: US 7,483,989 B2
(45) Date of Patent: Jan. 27, 2009

(54) METHOD AND APPARATUS FOR ESTABLISHING A PROTOCOL PROXY FOR A MOBILE HOST TERMINAL IN A MULTIMEDIA SESSION

(75) Inventors: Brian Williams, Victoria (AU); Ina B. Widegren, Stockholm (SE); Johnson Oyama, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1371 days.

(21) Appl. No.: 10/087,995

(22) Filed: Mar. 5, 2002

(65) Prior Publication Data

US 2002/0133600 A1 Sep. 19, 2002

Related U.S. Application Data

(60) Provisional application No. 60/275,354, filed on Mar. 13, 2001.

(51) Int. Cl.
*G06F 15/173* (2006.01)
(52) U.S. Cl. .................................................. 709/227
(58) Field of Classification Search ......... 709/227–238, 709/201–203, 223, 224, 226; 370/329–466; 455/450
See application file for complete search history.

(56) References Cited

U.S. PATENT DOCUMENTS

| 6,154,776 | A | * | 11/2000 | Martin | 709/226 |
| 6,621,793 | B2 | | 9/2003 | Widegren | |
| 6,654,610 | B1 | * | 11/2003 | Chen et al. | 455/450 |
| 6,658,011 | B1 | * | 12/2003 | Sevanto et al. | 370/401 |
| 6,728,208 | B1 | * | 4/2004 | Puuskari | 370/230.1 |
| 6,813,638 | B1 | * | 11/2004 | Sevanto et al. | 709/227 |
| 6,847,610 | B1 | * | 1/2005 | Suumaki et al. | 370/230.1 |
| 7,106,718 | B2 | | 9/2006 | Oyama et al. | |
| 2001/0026554 | A1 | * | 10/2001 | Holler et al. | 370/401 |
| 2001/0027490 | A1 | * | 10/2001 | Fodor et al. | 709/238 |
| 2002/0034166 | A1 | * | 3/2002 | Barany et al. | 370/329 |
| 2002/0062379 | A1 | | 5/2002 | Widegren | |
| 2002/0068545 | A1 | | 6/2002 | Oyama | |
| 2002/0093979 | A1 | * | 7/2002 | Chen et al. | 370/466 |
| 2002/0120749 | A1 | | 8/2002 | Widegren | |
| 2002/0165966 | A1 | | 11/2002 | Widegren | |

OTHER PUBLICATIONS

Bernet Y., The complementary roles of RSVP and differentiated services in the full service QoS network, Communication Magazine, IEEE, vol. 38, Issue 2, Feb. 2000, pp. 154-162.*

(Continued)

*Primary Examiner*—Andrew Caldwell
*Assistant Examiner*—Michael D Meucci
(74) *Attorney, Agent, or Firm*—Nixon & Vanderhye P.C.

(57) ABSTRACT

A protocol proxy relationship is established between a non-enabled host and a protocol-enabled router or other node in a multimedia session including a mobile communications network. A mechanism is provided that allows a non-enabled mobile terminal to communicate a protocol proxy request with a protocol-enabled node along an end-to-end path between the mobile terminal and a remote host. A mechanism is further provided to install information in the protocol enabled node so that it can function as the protocol proxy for the non-enabled mobile terminal.

28 Claims, 8 Drawing Sheets

OTHER PUBLICATIONS http://www.3gpp.org/ftp/tsg_sa/WG2_Arch/TSGS2_14/tdocs/S2-001539, TSG-SA WG2, SA2 Meeting, Sep. 4-8, 2000, Bristol, England, "Optionality of QoS Scenarios".

http://www.3gpp.org/ftp/tsg_sa/WG2_Arch/TSGS2_14/tdocs/S2-001445, 3GPP_TSG_SAWG2 Drafting Meeting on QoS Issues, Bristol, UK, Sep. 4-8, 2000, "IP Specific Elements in PDP Context Activation/Modification".

http://www.3gpp.org/ftp/tsg_sa/WG2_Arch/drafting_meetings/00_06_Sophia/QoS/S2-000936, 3GPP TSG SA WG2 #13, Berlin, Germany, Jun. 22-26, 2000, "RSVP Usage in UMTS Networks".

http://www.3gpp.org/ftp/tsg_sa/WG2_Arch/drafting_meetings/00_06_Sophia/QoS/S2-001136, TSG-SA Working Group 2 QoS Drafting Session, Sophia Antipolis, France, Jun. 13-14, 2000, "A SIP-based Call Control Model with End-to-End QoS Negotiation".

http://www.3gpp.org/ftp/tsg_sa/WG2_Arch/drafting_meetings/00_06_Sophia/QoS/S2-001146, 3GPP_TSG_SAWG2 Drafting Meeting on QoS Issues, Sophia Antipolis, France, Jun. 13-14, 2000, "UMTS Specific IP QoS Attributes".

http://www.3gpp.org/ftp/tsg_sa/WG2_Arch/drafting_meetings/00_06_Sophia/QoS/S2-001153, 3GPP_TSG_SAWG2 Drafting Meeting on QoS Issues, Sophia Antipolis, France, Jun. 13-14, 2000, "Additional Scenarios for Appendix A and Creation of Appendix D".

http://www.3gpp.org/ftp/tsg_sa/WG2_Arch/drafting_meetings/00_06_Sophia/QoS/S2-001154, 3GPP_TSG_SAWG2 Drafting Meeting on QoS Issues, Sophia Antipolis, France, Jun. 13-14, 2000, "RSVP Usage for End-to-End QoS in UMTS".

http://www.3gpp.org/ftp/tsg_sa/WG2_Arch/drafting_meetings/00_10_Sophia_Ant/tdocs/S2-001701, 3GPP TSG-SA Working Group 2, R00 ad-hoc Sophia Antipolis, France, Oct. 9-12, 2000, "Requirements for a relationship between CC and (Access IP-connectivity) bearer control".

http://www.3gpp.org/ftp/tsg_sa/WG2_Arch/drafting_meetings/00_10_Sophia_Ant/tdocs/S2-001704, 3GPP TSG-SA Working Group 2, R00 ad-hoc Sophia Antipolis, France, Oct. 9-12, 2000, "End-to-End QoS Scenarios for IPMM service".

http://www.3gpp.org/ftp/tsg_sa/WG2_Arch/drafting_meetings/00_10_Sophia_Ant/tdocs/S2-001721, TSG-SA Working Group 2, SA2 Drafting Meeting, QoS-CallFlow Joint Session, Sophia Antipolis, France, Oct. 9-12, 2000, "Requirements for QoS Interactions with Call Signaling".

http://www.3gpp.org/ftp/tsg_sa/WG2_Arch/drafting_meetings/00_10_Sophia_Ant/tdocs/S2-001744, 3GPP TSG-SA Working Group 2, R00 ad-hoc Sophia Antipolis, France, Oct. 9-12, 2000, "Requirements for a relationship between CC and (Access IP-connectivity) bearer control".

http://www.3gpp.org/ftp/tsg_sa/WG2_Arch/drafting_meetings/00_10_Sophia_Ant/tdocs/S2-001755, 3GPP TSG-SA Working Group 2, R00 ad-hoc Sophia Antipolis, France, Oct. 9-12, 2000, "Requirements for a relationship between CC and (Access IP-connectivity) bearer control".

http://www.3gpp.org/ftp/tsg_sa/WG2_Arch/drafting_meetings/00_10_Sophia_Ant/tdocs/S2q000014, TSG-SA Working Group 2, QoS Drafting, Sophia Antipolis, France, Oct. 9-12, 2000, "Operator Requirements for End-to-End IP QoS".

http://www.3gpp.org/ftp/tsg_sa/WG2_Arch/TSGS2_13/tdocs/S2-000723, TSG-SA Working Group 2, Stockholm, Sweden, May 9-12, 2000, "Integration of SIP Signaling and Resource Management in 3GPP".

http://www.3gpp.org/ftp/tsg_sa/WG2_Arch/TSGS2_13/tdocs/S2-000724, 3GPP TSG SA WG2, QoS Drafting Meeting, Stockholm, Sweden, May 9-11, 2000, "QoS Control of the IP Bearer Service".

http://www.3gpp.org/ftp/tsg_sa/WG2_Arch/TSGS2_13/tdocs/S2-000726, 3GPP TSG SA W2, QoS Drafting Session, Stockholm, Sweden, May 9-11, 2000, "QoS Policies in UMTS Release 2000".

http://www.3gpp.org/ftp/tsg_sa/WG2_Arch/TSGS2_13/tdocs/S2-000727, 3GPP TSG SA W2, QoS Drafting Session, Stockholm, Sweden, May 9-11, 2000, "Interaction between Call Control and QoS Negotiation".

http://www.3gpp.org/ftp/tsg_sa/WG2_Arch/TSGS2_13/tdocs/S2-000735, 3GPP TSG SA WG2, QoS Drafting Meeting, Stockholm, Sweden, May 9-11, 2000, "QoS Control of the IP Bearer Service".

http://www.3gpp.org/ftp/tsg_sa/WG2_Arch/TSGS2_13/tdocs/S2-000737, 3GPP TSG SA WG2, QoS Drafting Meeting, Stockholm, Sweden, May 9-11, 2000, "Policy Issues for Dynamic QoS".

http://www.3gpp.org/ftp/tsg_sa/WG2_Arch/TSGS2_13/tdocs/S2-000920, 3GPP TSG2 #13, Berlin, Germany, May 22-26, 2000, "Introducing the QoS Policy Manager into UMTS QoS Architecture".

http://www.3gpp.org/ftp/tsg_sa/WG2_Arch/TSGS2_13/tdocs/S2-000921, 3GPP TSG SA WG 2, Berlin, Germany, May 22-26, 2000, "Classification of QoS Policies".

http://www.3gpp.org/ftp/tsg_sa/WG2_Arch/TSGS2_13/tdocs/S2-000947, TSG-SA Working Group 2, Berlin, Germany, May 22-26, 2000, "Interface Between GGSN and Policy Control Point".

http://www.3gpp.org/ftp/tsg_sa/WG2_Arch/TSGS2_13/tdocs/S2-000948, TSG-SA Working Group 2, Berlin, Germany, May 22-26, 2000, "Use of RSVP for QoS Management".

http://www.3gpp.org/ftp/tsg_sa/WG2_Arch/TSGS2_13/tdocs/S2-000949, TSG-SA Working Group 2, Berlin, Germany, May 22-26, 2000, "Two Phase Resource Management for EGPRS/UMTS".

PacketCable Dynamic Quality of Service Specification, PKT-SP-DQOS-I01-991201, http://www.packetcable.com/specs/pkt-sp-dqos-I01-991201.pdf.

PacketCable Dynamic Quality of Service Specification, PKT-SP-DQOS-I03-020116, http://www.packetcable.com/specs/pkt-sp-dqos-I03-020116.pdf.

3GPP Contribution S2-000165, Jan. 2000, Puerto Vallarta, "Network Initiated Secondary PDP Context activation procedure".

Marshall et al., "Integration of Resource Management and SIP for IP Telephony," SIP Working Group, Internet Draft, Mar. 2000. http://www.ietf.org/internet-drafts/draft-manyfolks-sip-resource-00.txt.

Marshall et al., "Integration of Resource Management and SIP," SIP Working Group, Internet Draft, Jun. 2000. http://www.ietf.org/internet-drafts/draft-manyfolks-sip-resource-01.txt.

Marshall et al., "Integration of Resource Management and SIP," SIP Working Group, Internet Draft, Nov. 2000. http://www.ietf.org/internet-drafts/draft-ietf-sip-manyfolks-resource-00.

Marshall et al., "Integration of Resource Management and SIP," SIP Working Group, Internet Draft, Feb. 2001. http://www.ietf.org/internet-drafts/draft-ietf-sip-manyfolks-resource-01.

http://www.3gpp.org/ftp/tsg_sa/WG2_Arch/TSGS2_15/tdocs/S2-001964, 3GPP TSG SA2, Tokyo, Nov. 13-17, 2000, "Session Setup with Media Authorization".

http://www.3gpp.org/ftp/tsg_sa/WG2_Arch/TSGS2_15/tdocs/S2q000047, TSG-SA WG2, SA2 Meeting, Nov. 13-17, 2000, Makuhari, Japan, "Architecture Requirements for Policy Enforcement and Control".

http://www.3gpp.org/ftp/tsg_sa/WG2_Arch/TSGS2_15/tdocs/S2q000033, TSG-SA WG2, SA2 Meeting, Nov. 13-17, 2000, Makuhari, Japan, "Architecture Requirements for Policy Enforcement and Control".

http://www.3gpp.org/ftp/tsg_sa/WG2_Arch/TSGS2_15/tdocs/S2q000034, TSG-SA WG2, SA2 Meeting, Nov. 13-17, 2000, Makuhari, Japan, "Resource Authorization, Reservation and Bearer Establishment".

http://www.3gpp.org/ftp/tsg_sa/WG2_Arch/TSGS2_15/tdocs/S2-001931, 3GPP TSG-SA Working Group 2, Makuhari, Japan, Nov. 13-17, 2000, "End-to-End QoS Scenarios for IPMM service".

Yavatkar et al., "A Framework for Policy-based Admission Control," Network Working Group, Request for Comments: 2753, http:www.ietf.org/rfc/rfc2753.txt?number=2753, Jan. 2000.

Boyle et al., "The COPS (Common Open Policy Service) Protocol," Network Working Group, Request for Comments: 2748, Jan. 2000.

Sinnreich et al., "Interdomain IP Communications with QoS, Authorization and Usage Reporting," Internet Draft, Mar. 2000, http://www.ietf.org/internet-drafts/draft-sinnreich-interdomain-sip-qos-osp-01.txt.

Vollbrecht et al., "AAA Authorization Framework," Network Working Group, Request for Comments: 2904, Aug. 2000.

Marshall et al., "SIP Extensions for Media Authorization," SIP Working Group, Internet Draft, Mar. 2000, http://www.ietf.org/internet-drafts/draft-dcsgroup-sip-call-auth-01.txt.

Marshall et al., "SIP Extensions for Media Authorization," SIP Working Group, Internet Draft, Nov. 2000, http://www.ietf.org/internet-drafts/draft-ietf-sip-call-auth-00.txt.

Marshall et al., "SIP Extensions for Media Authorization," SIP Working Group, Internet Draft, Feb. 2001, http://www.ietf.org/internet-drafts/draft-ietf-sip-call-auth-01.txt.

Handley et al., "SIP: Session Initiation Protocol," Internet Engineering Task Force, Internet Draft, Nov. 2000, http://www.ietf.org/internet-drafts/draft-ietf-sip-rfc2543bis-02.txt.

Sinnreich et al., "AAA Usage for IP Telephony with QoS," Internet Draft, Jul. 2000, http://www.ietf.org/internet-drafts/draft-sinnreich-aaa-interdomain-sip-qos-osp-00.txt.

Handley et al., "SDP: Session Description Protocol," Network Working Group, Request for Comments: 2327, Apr. 1998.

S2q-000005, 3GPP Technical Specification, 3G TS 23.XXX, V0.0.0, Oct. 9-12, 2000, "3rd Generation Partnership Project; Technical Specification Group Services and System Aspects; End-to-End QoS Concept and Architecture in UMTS (Release 5)."

S2q-000009, 3GPP Technical Specification, 3G TS 23.207, V0.0.1, Oct. 9-12, 2000, "3rd Generation Partnership Project; Technical Specification Group Services and System Aspects; End-to-End QoS Concept and Architecture."

S2q000018, 3GPP Technical Specification, 3G TS 23.207, V0.0.2, Nov. 13-17, 2000, "3rd Generation Partnership Project; Technical Specification Group Services and System Aspects; End-to-End QoS Concept and Architecture."

3GPP Technical Specification, 3G TS 23.207, V1.0.0, Nov. 2000, "3rd Generation Partnership Project; Technical Specification Group Services and System Aspects; End-to-End QoS Concept and Architecture."

Hamer et al., "Session setup with media authorization," Nov. 2000, http://www.softarmor.com/sipwg/drafts/draft-hamer-sip-session-auth-00.text.

Gibson et al., "Use of SIP for the Reservation of QoS guaranteed Paths," Internet Draft, Oct. 1999, <draft-gibson-sip-qos-resv-00.txt>.

http://www.3gpp.org/ftp/tsg_sa/WG2_Arch/TSGS2_16/tdocs/S2-010013, TSG-SA WG2 SA2 Meeting, Los Angeles, Jan. 22-26, 2001, "Resource Reservation and Authorization with Enhanced UMTS QoS Signaling".

http://www.3gpp.org/ftp/tsg_sa/WG2_Arch/TSGS2_16/tdocs/S2-010014, TSG-SA WG2 SA2 Meeting, Los Angeles, Jan. 22-26, 2001, "Resource Reservation and Authorization with Enhanced UMTS QoS Signaling and RSVP inter-working at GGSN".

http://www.3gpp.org/ftp/tsg_sa/WG2_Arch/TSGS2_16/tdocs/S2-010016, TSG-SA WG2 SA2 Meeting, Los Angeles, Jan. 22-26, 2001, "IP Specific Elements in UMTS Signaling".

http://www.3gpp.org/ftp/tsg_sa/WG2_Arch/TSGS2_16/tdocs/S2-010020, TSG-SA Working Group 2, Los Angeles, Jan. 22-26, 2001, "RSVP translation to PDP context establishment".

http://www.3gpp.org/ftp/tsg_sa/WG2_Arch/TSGS2_16/tdocs/S2-010021, TSG-SA Working Group 2, Los Angeles, Jan. 22-26, 2001, "Policy management using RSVP tokens".

http://www.3gpp.org/ftp/tsg_sa/WG2_Arch/TSGS2_16/tdocs/S2-010022, TSG-SA Working Group 2 Plenary Session #16, Los Angeles, Jan. 22-26, 2001, "The UMTS QoS Policy Framework".

http://www.3gpp.org/ftp/tsg_sa/WG2_Arch/TSGS2_16/tdocs/S2-010023, TSG-SA Working Group 2 Plenary Session #16, Los Angeles, Jan. 22-26, 2001, "QoS Policy Control in UMTS QoS Management".

http://www.3gpp.org/ftp/tsg_sa/WG2_Arch/TSGS2_16/tdocs/S2-010025, TSG-SA Working Group 2 Plenary Session #16, Los Angeles, Jan. 22-26, 2001, "Expansion of 'Authorize QoS Resources' Procedure for UMTS Call Flow Scenarios".

http://www.3gpp.org/ftp/tsg_sa/WG2_Arch/TSGS2_16/tdocs/S2-010033, 3GPP TSG SAWG2 Drafting Meeting on QoS Issues, Los Angeles, Jan. 22-26, 2001, "IP Specific Elements in UMTS Signaling".

http://www.3gpp.org/ftp/tsg_sa/WG2_Arch/TSGS2_16/tdocs/S2-010037, "Binding information for bearer authorization".

http://www.3gpp.org/ftp/tsg_sa/WG2_Arch/TSGS2_17/tdocs/S2-010412, TSG-SA WG2 SA2 Meeting, Gothenburg, Sweden, Feb. 26-Mar. 2, 2001, "Binding Information in PDP Context Activation".

http://www.3gpp.org/ftp/tsg_sa/WG2_Arch/TSGS2_17/tdocs/S2-010420, 3GPP TSG SA WG2, Gothenburg, Sweden, Feb. 26-Mar. 2, 2001, "Binding Information for bearer authorization".

http://www.3gpp.org/ftp/tsg_sa/WG2_Arch/TSGS2_17/tdocs/S2-010557, 3GPP TSG-SA WG2 Meeting #17, Gothenburg, Sweden, Feb. 26-Mar. 2, 2001, "PDP Context establishment for IP MM service".

* cited by examiner

METHOD AND APPARATUS FOR ESTABLISHING A PROTOCOL PROXY FOR A MOBILE HOST TERMINAL IN A MULTIMEDIA SESSION

CROSS-REFERENCE TO RELATED APPLICATIONS

This application is related to commonly-assigned U.S. patent application Ser. No. 09/768,956 (abandoned), entitled "RSVP Handling in 3G Networks," filed on Jan. 24, 2001; U.S. patent application Ser. No. 09/861,817 (U.S. Pat. No. 6,621,793), entitled "Application Influenced Policy," filed on May 21, 2001; U.S. patent application Ser. No. 09/985,573, entitled "Media Binding to Coordinating Quality of Service Requirements for Media Flows in a Multimedia Session with IP Bearer Resources," filed Nov. 5, 2001; and U.S. patent application Ser. No. 09/985,633 (abandoned), entitled "Method and Apparatus for Coordinating Charges for Services Provided in a Multimedia Session," filed Nov. 5, 2001; and U.S. patent application Ser. No. 09/985,631 (abandoned), entitled "Method and Apparatus for Coordinating Quality of Service Requirements for Media Flows in a Multimedia System With IP Bearer Resources," filed Nov. 5, 2001; U.S. patent application Ser. No. 10/038,770 (abandoned), entitled "Method and Apparatus for Coordinating End-to-End Quality of Service Requirements for Media Flows in a Multimedia Session," filed Jan. 8, 2002, and U.S. patent application Ser. No. 10/068,002 (U.S. Pat. No. 7,106,718), entitled the "A Signaling Quality of Service Class for Use in Multimedia Communications," filed Feb. 8, 2002, the disclosures of which are incorporated herein by reference.

REFERENCE TO PRIORITY APPLICATIONS

This application claims priority from and incorporates by reference the following commonly-assigned provisional patent applications: 60/275,354 entitled "Enhancement of Authorization Token for RSVP Interworking," filed Mar. 13, 2001.

FIELD OF THE INVENTION

The present invention generally relates to Internet Protocol (IP) networks, and more specifically, to establishing end-to-end Quality of Service (QoS) in IP networks with multimedia applications.

BACKGROUND

IP networks were originally designed to carry "best effort" traffic where the network makes a "best attempt" to deliver a user packet, but does not guarantee that a user packet will arrive at the destination. Because of the market success of IP networks, there is a clear requirement for mechanisms that allow IP networks to support various types of applications. Some of these applications have Quality of Service (QoS) requirements other than "best effort" service. Examples of such applications include various real time applications (IP Telephony, video conferencing), streaming services (audio or video), or high quality data services (browsing with bounded download delays). Recognizing these QoS requirements, the Internet Engineering Task Force (IETF), which is the main standards body for IP networking, standardized a set of protocols and mechanisms that enable IP network operators to build QoS-enabled IP networks.

Figure 1:
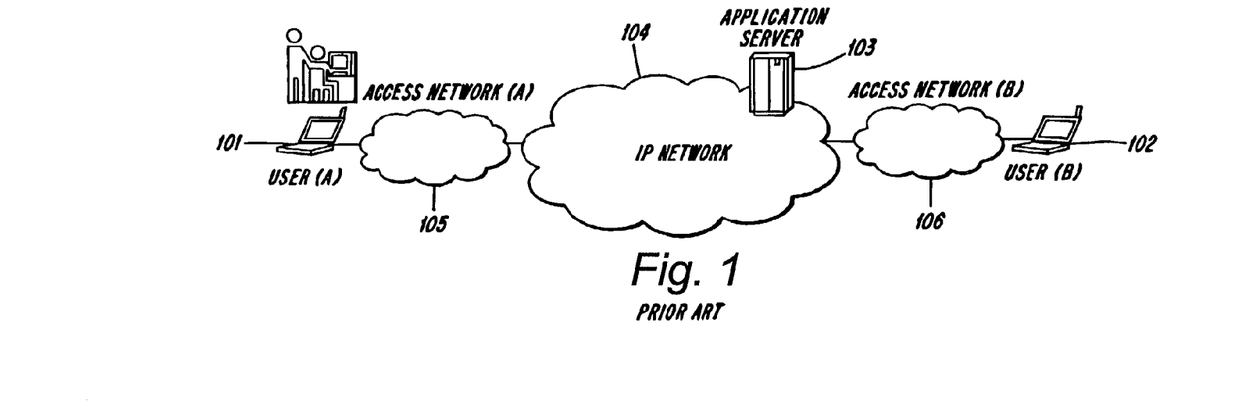
FIG. 1 is a block diagram of a high level IP network.

FIG. 1 depicts a simplified high-level model of an IP network which may be useful in explaining QoS provisioning. As can be appreciated, the model includes two users, but could easily be expanded to include more users without changing the basic functionality of the network. In FIG. 1, User-A 101 may communicate with User-B 102 or with an application server 103. For example, in the case of an IP telephony session, User-A 101 may communicate with User-B 102. Similarly, in the case of streaming services, User-A 101 may communicate with the application server 103, which may be configured as a video server. In either case, User-A 101 accesses an IP backbone network 104 through a local access network 105, such as PSTN (dial-in access), Global System for Mobile Communications (GSM), or Universal Mobile Telecommunications System (UMTS) network. User-B 102 is similarly connected to the IP network 104 through a local access network 106. It will be appreciated that User-A and User-B need not use the same type of access network. The IP network 104 may consist of a number of IP routers and interconnecting links that together provide connectivity between the IP network's ingress and egress points and thereby make two party communication possible. As far as the users are concerned, the perceived QoS depends on the mechanisms both in the access networks 105, 106 and on the IP backbone network 104. Of particular interest to this invention is the specific case where at least one of the access networks is a UMTS or GSM/GPRS network.

When users access IP-based services, they may use a device that runs an application program that provides the interface for the user to access the particular service. For instance, in FIG. 1, User-A may use a laptop running a conferencing application program to attend an IP network based meeting, where participants of the meeting collaborate using various programs. Such programs are well known in the art.

Various user applications may access network services through an application programming interface (API). An API provides aplication programmers with a uniform interface to access underlying system resources. For instance, an API may be used to configure a network resource manager to require that a particular IP packet originating from a given application receive a certain treatment from the network, such as a particular QoS. For example, if the IP network is a Differentiated Services IP network, then an application program may request that all of its IP packets receive the "Expedited Forwarding" treatment.

The User (and the API in the user's equipment may not be aware of the different technologies that various access networks and IP backbone networks employ in order to provide QoS end-to-end, i.e., from User-A all the way to remote User B. For instance, the application program may use an RSVP/IntServ based API, and the end-to-end embodiment in which he is involved may include a UMTS access network and a non-RSVP enabled IP network. In such cases, some "interworking" mechanisms between such different technologies and protocols are needed to make sure that the QoS is provided end-to-end.

Integrated Services (IntServ) provides a set of well-defined services which enables an application to choose among multiple, controlled levels of delivery service for its data packets. To support this capability, two things are required. First, individual network elements, such as subnets and IP routers, along the path followed by an application's data packets must support mechanisms to control the quality of service delivered to those packets. Second, a way to communicate the application's requirements to network elements along the path and to convey QoS management information between network elements and the application must be provided.

IntServ defines a number of services such as Controlled-Load (defined in IETF RFC 2211) and Guaranteed (defined in IETF RFC 2212). The service definition sets forth the required characteristics of the network equipment in order to deliver the service. The individual network elements (subnets and IP routers) that support the service must comply with the definitions defined for the service.

The service definition also defines the information that must be provided across the network in order to establish the service. This function may be provided in a number of ways, but it is frequently implemented by the resource reservation setup protocol RSVP (defined in IETF RFC 2205). RSVP (Resource reSerVation Protocol) is an IP-level resource reservation setup protocol designed for an IntServ-enabled Internet (defined in IETF RFC 1633, 2205, and 2210). The RSVP protocol is used by a local host (e.g., User A's computer) to request a specific quality of service from the network for particular application data streams or flows along the data path between sender and receiver. RSVP is also used by routers to deliver quality-of-service request to all nodes along the path(s) of the flows and to establish and maintain the state(s) to provide the requested service. RSVP request generally result in resources being reserved in each node along the data path.

Figure 2:
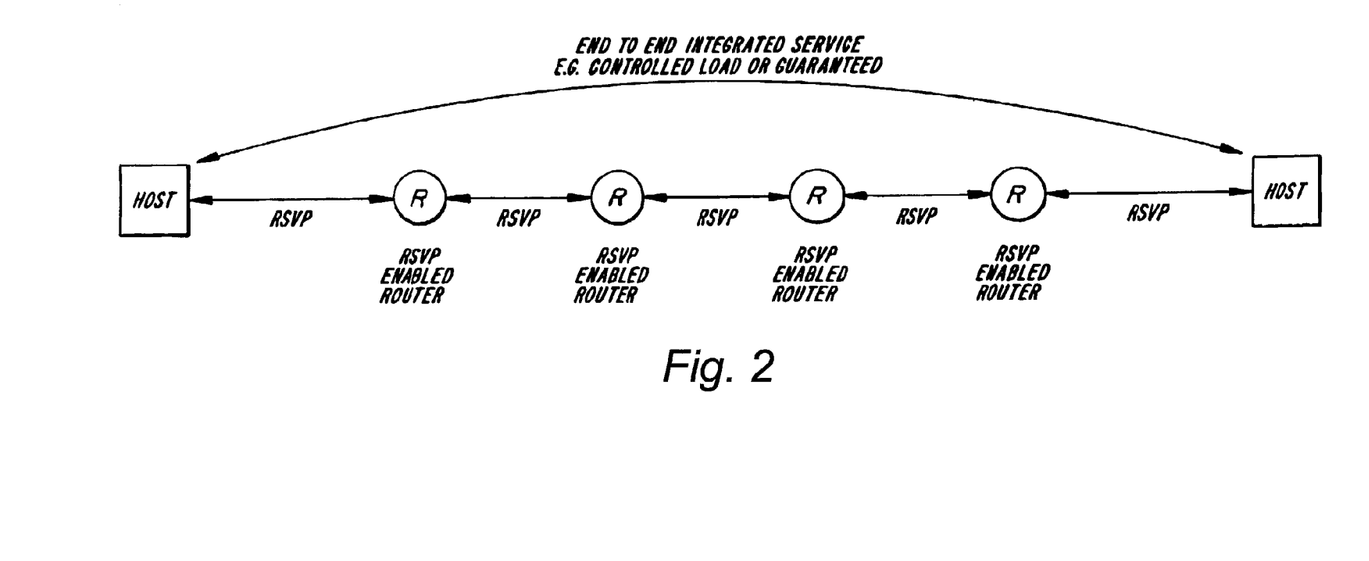
FIG. 2 is a block diagram depicting an example of a network employing end-to-end integrated services.

FIG. 2 shows an End-to-End Integrated Service between the hosts. The service is provided using routers and hosts that support the service definition defined for the required service and through signaling of the relevant information between the nodes. In order to use RSVP, each of the devices in the path between the sender and receiver must be capable of understanding and sending RSVP messages. However, some end devices may not be RSVP-enabled, and therefore, can not use RSVP to reserve bandwith or other quality of service characteristics. An RSVP "proxy" can be defined to solve this problem by emulating an RSVP sender or receiver on behalf of such devices. More generally, a proxy is a network device, such as a router or a switch, that performs one or more functions on behalf of another device. As applied to RSVP, and RSVP Proxy originates the RSVP PATH message and receives the incoming RESV message on behalf of a non-RSVP enabled node. (PATH and RESV are examples of RSVP messages.) It also receives an incoming PATH message and originates the RESV response message on behalf of a non-RSVP enabled node. In other words, the RSVP Proxy acts on behalf of the non-RSVP enabled node to facilitate resource reservation without that node having to be involved in the RSVP signaling.

The problem addressed here is how to establish a protocol proxy relationship in a multimedia session involving a mobile communications access network and a non-enabled mobile terminal. A mechanism is provided that allows the non-enabled mobile terminal to communicate a protocol proxy request with an enabled node along the send-receive path between the mobile terminal and a remote host. A mechanism is further provided to install information in the enabled node so that the node can function as the protocol proxy for the non-enabled mobile host.

In setting up a multimedia session between the mobile terminal and the remote host by way of an access point coupled to a packet data network, the mobile terminal sends a request message associated with the multimedia session to the access point. The message request a packet access bearer between the mobile terminal and the access point. The mobile terminal sets an indicator in the request message to indicate that the access point should function as a communications protocol proxy for the mobile terminal for the multimedia session.

From the perspective of the access point, the received request message is asking for a packet access bearer between the mobile terminal and the access point for the multimedia session. Detecting the indicator in the request message means that the access point should function as a communications protocol proxy for the mobile terminal for the multimedia session. Accordingly, the access point performs as the communications protocol proxy for the mobile terminal for the multimedia session.

In one non-limiting example, the request message indicates a particular Quality of Service (QoS), and the communications protocol is the resource reservation protocol (RSVP). Thus, the access point is an RSVP proxy for the mobile terminal during the multimedia session. The mobile terminal may be a User Equipment (UE) that communicates with a General Packet Radio Service (GPRS) access network by way of a UMTS Terrestrial Radio Access Network (UTRAN). In this context, the access point may be a Gateway GPRS Service Node (GGSN). The request message may be a Packet Data Protocol (PDP) context request message, and the indicator may be an RSVP proxy flag. In one example implementation, the PDP context request message may include the RSVP proxy flag as a PDP configuration option (PCO). When the indicator is set, an RSVP proxy state process for the multimedia session is installed from a multimedia server in the GGSN. Thereafter, the RSVP proxy-GGSN generates an RSVP PATH message directed to the remote host, and in response thereto, receives an RSVP RESV message from the remote host on behalf of the mobile terminal. It also generates an RSVP RESV message in response to a received RSVP PATH message as well as generates/responds to RSVP messages other than PATH and RESV, e.g., RESV cont.

Another aspect of the invention includes a computer-generated data signal embodied in an electrical signal for use in a GPRS/UMTS network. A Packet Data Protocol (PDP) context activation, creation, modification, or update message for establishing or updating a multimedia sessions between a mobile terminal and a remote host includes plural fields of information. In particular, the PDP message includes a PDP configuration options (PCO) field that includes an indicator indicating whether the access point should function as a communications protocol proxy for the mobile terminal for the multimedia session. In one example implementation, the indicator field is included with an authorization token and a media binding token associated with the multimedia session.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart form these specific details. For example, while the present invention is described in an example application to the GSM/UMTS system, the present invention may be employed in any access network system.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

In the following description, a mobile terminal is used as one example of a user equipment (UE) allowing a user access to network services. In a mobile radio communications system, the interface between the user equipment and the network is the radio interface. Thus, although the present invention is described using the term "mobile terminal," the present invention may be applied to any type or configuration of user equipment that can communicate over a radio interface.

To realize a QoS with clearly defined characteristics and functionality, a bearer must be set up from the source to the destination of the service that supports that QoS. A bearer is a logical connection between two entities through one or more interfaces, networks, gateways, etc., and usually corresponds to a data stream. A QoS bearer service includes all aspects to enable the provision of a contracted QoS. These aspects are among others the control signaling, user plane transport, and QoS management functionality. To provide IP quality of service end-to-end from mobile terminal to a remote host, it is necessary to manage the quality of service within each domain in the end-to-end path where each domain corresponds to a set of nodes utilizing the same QoS mechanisms.

As explained in the background, it may be the case that not every node in the end-to-end path supports a particular protocol being used to set up, reserve, or otherwise support a QoS related to a multimedia session. In a multimedia communication between a mobile terminal and remote host, it may be that the mobile terminal does not support a QoS reservation protocol supported by the remote host and the nodes in the end-to-end path between the mobile terminal and the remote host. In this case, the mobile terminal may request one of the nodes in the path to function as its protocol proxy to send and receive protocol messages on its behalf.

Figure 3:
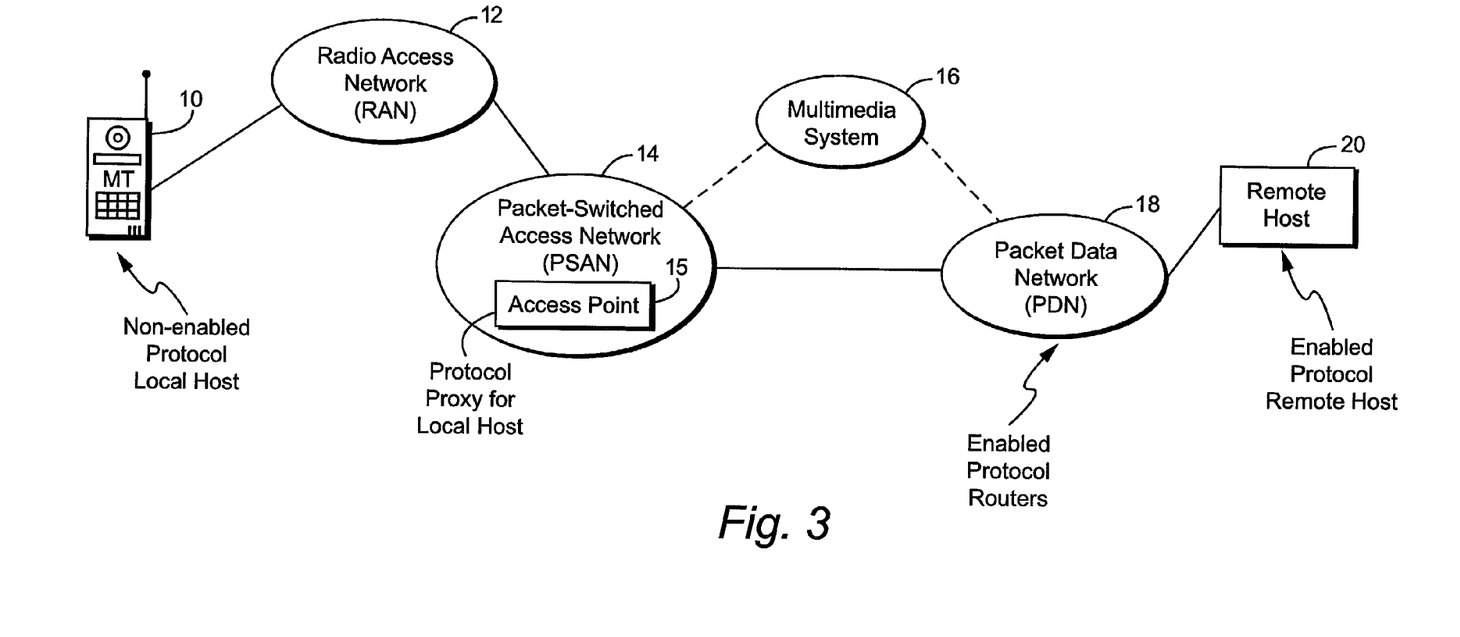
FIG. 3 illustrates a communications system in which a multimedia session may be established between a mobile terminal and a remote host.

Consider the example, simplified communications system shown in FIG. 3 which permits a Mobile Terminal (MT) 10 to initiate and conduct a multimedia session with a remote host 20. In this example, the MT 10 is a non-enabled protocol host. The remote host 20 can be a fixed or wireless device, and in this example, is an enabled protocol host. The remote host 20 can be a fixed or wireless device, and in this example, is an enabled protocol host. The mobile terminal 10 is coupled to a radio access network (RAN) 12 over the radio interface. The RAN 12 is coupled to an Access Point 15 in a packet-switched access network (PSAN) 14. The access point 15 functions as the protocol proxy for the MT local host. Protocol messages to be sent and received by the MT 10 are sent and received by the access point 15 on behalf of the MT 10. The PSAN 14 is coupled to a Packet Data Network (PDN) 18 to which the remote host 20 is coupled. The basic traffic flow for a multimedia session (shown as solid lines) between the mobile terminal 10 and remote host 20 is transported via these three networks 12, 14, and 18. The PSAN 14 and the PDN 18 communicate multimedia control signaling (shown as dashed lines) to a Multimedia System 16 that can be separate from or an integral part of the Packet Data Network 18.

Figure 4:
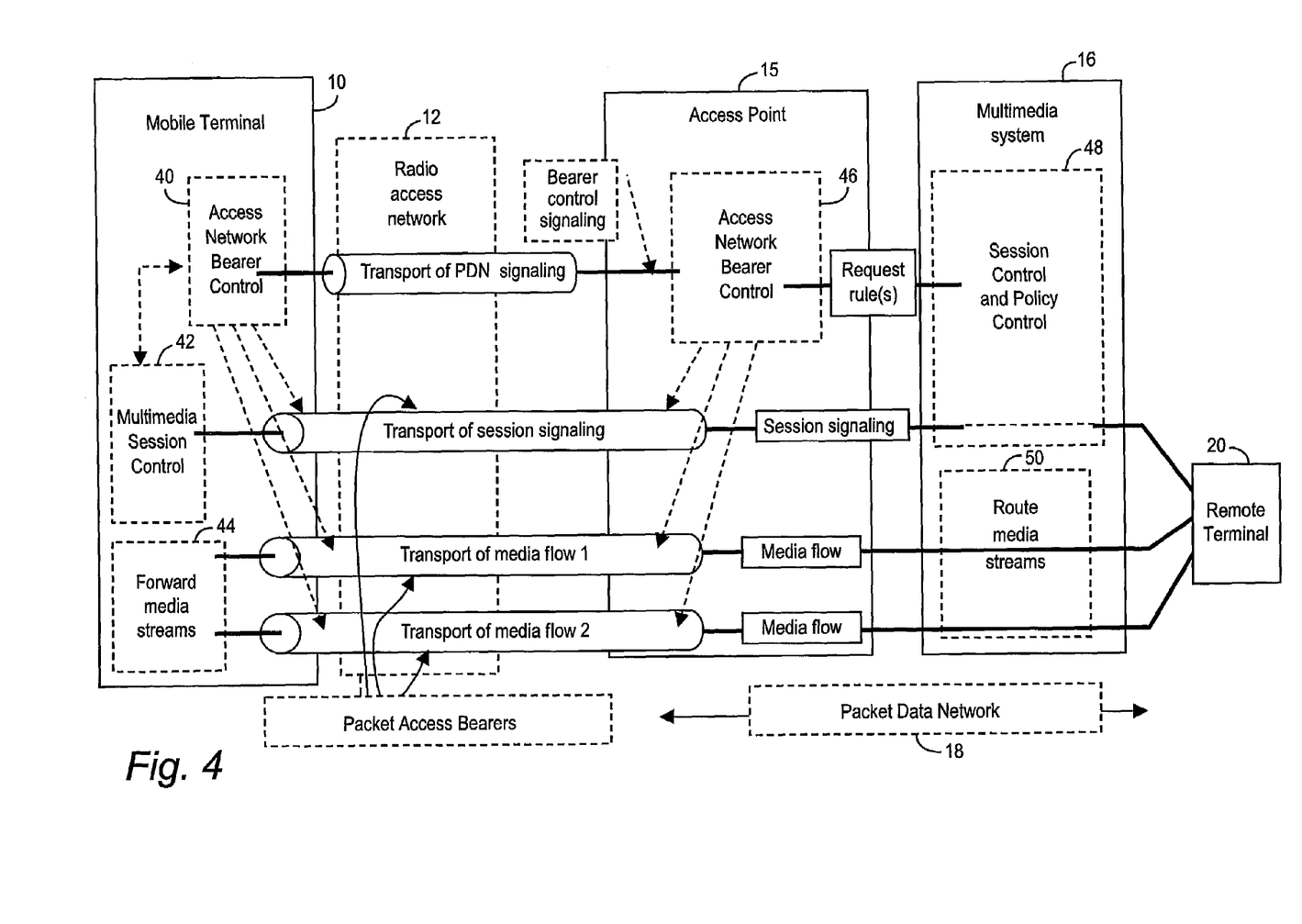
FIG. 4 illustrates in block format various functions performed by the mobile terminal, access point, and multimedia system.

To provide further details regarding setting up a multimedia session between the MT 10 and the remote host 20, reference is now made to FIG. 4. The mobile terminal 10 includes Access Network Bearer Control 40 coupled to multimedia session control 42. The Access Network Bearer Control block 40 transports internal bearer control signaling, which is not dedicated to a particular session, to an Access Network Bearer Control block 46 in the Access Point 15 transparently through the radio access network over a PDN signaling transport bearer. Both Access Network Bearer Control blocks 40 and 46 assist in establishing a packet access bearer for setting up the session shown as the pipe entitled "transport of session signaling." Over this bearer, the mobile terminal 10 initiates a multimedia session including a plurality of media data streams with the remote terminal 20. Each media data stream or "flow" is transported over a corresponding packet access bearer illustrated as a "transport of media flow" pipe coupled to a Forward Media Streams block 44 in the mobile terminal. Two media flows 1 and 2 are shown for purposes of illustration in this multimedia session. The multimedia system 16 in the packet data network 18 employs a Route Media Streams block 50 to route the packets in each media flow between the mobile terminal 10 and the remote terminal/host 20. Multimedia system 16 includes a Session Control and Policy Control block 48 that utilizes session signaling from the Multimedia Session Control block 42 in the mobile terminal 10 to correlate each multimedia flow and its corresponding quality of service requirements with the session to establish necessary admission and policy enforcement rules for the session. Those rules are provided upon request to the Access Network Bearer Control block 46 which performs admission and policy enforcement operations for the session in accordance with the obtained session rules.

Figure 5:
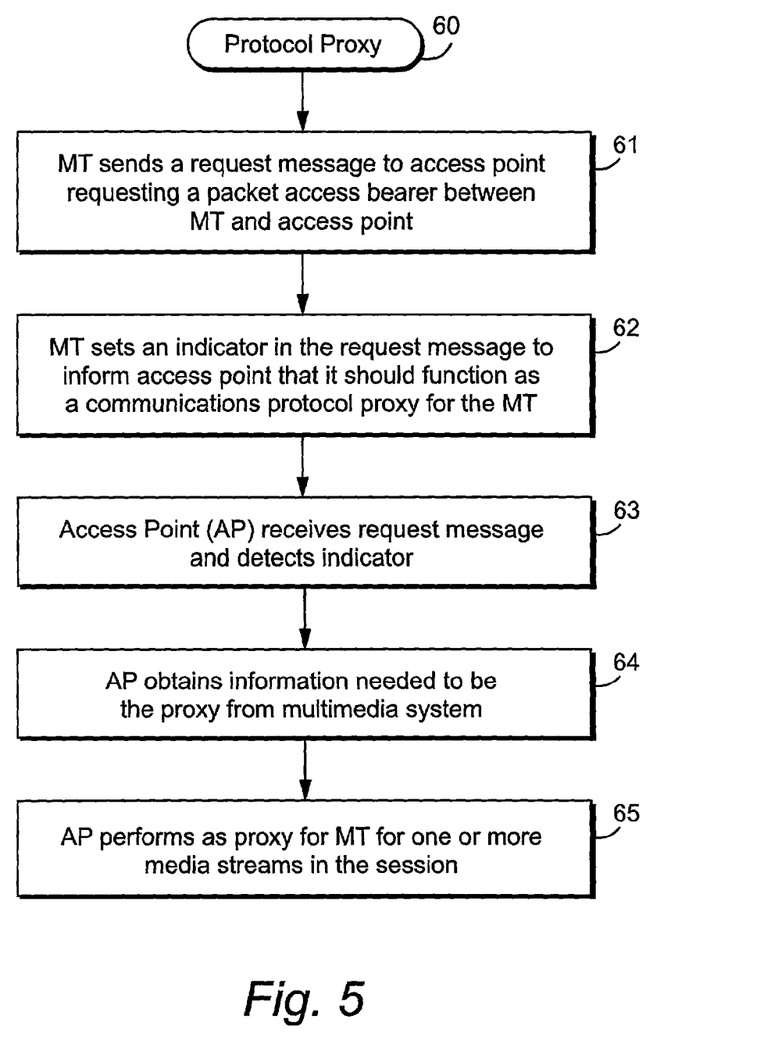
FIG. 5 is a flowchart illustrating example procedures for establishing a protocol proxy for a multimedia session in the system shown in FIG. 3.

The protocol proxy relationship between the MT 10 and the access point 15, where the access point 15 is the proxy for the MT 10, is established during set up of each packet access bearer associated with the session. Example protocol proxy establishment procedures are described now in conjunction with the "Protocol Proxy" routine (block 60) show in the flowchart of FIG. 5. The mobile terminal 10 sends a request message to the access point 15 requesting a packet access bearer between the mobile terminal and the access point (block 61). The mobile terminal 10 sets an indicator in the request message to request that the access point function as a communications protocol proxy for the mobile terminal (block 62). The access point receives the request message and detects the indicator (block 63). The access point then obtains from the multimedia system information needed to function as such a proxy for one or more identified media streams in the session, e.g., from the session control and policy control 46 (block 64). Once the proxy information is installed, the access point functions as a communications protocol proxy for those media streams for the mobile terminal during the multimedia session (block 65). In particular, the access point generates/sends appropriate communications protocol messages and processes received communications protocol messages on behalf of the mobile terminal for those media streams.

Thus, even though the mobile terminal cannot directly support communications protocol messaging with the remote host, the mobile terminal can do so indirectly through the proxy. The proxy indicator, being included in the packet access bearer request message, is an easy and effective way to inform the access point of the mobile terminal's need for a communications protocol proxy. The proxy indicator is advantageously sent at the same time that various attributes of the packet access bearer are being established and configured in the access point. As these bearer attributes are being configured, the communications protocol proxy is installed in the access point.

Figure 6:
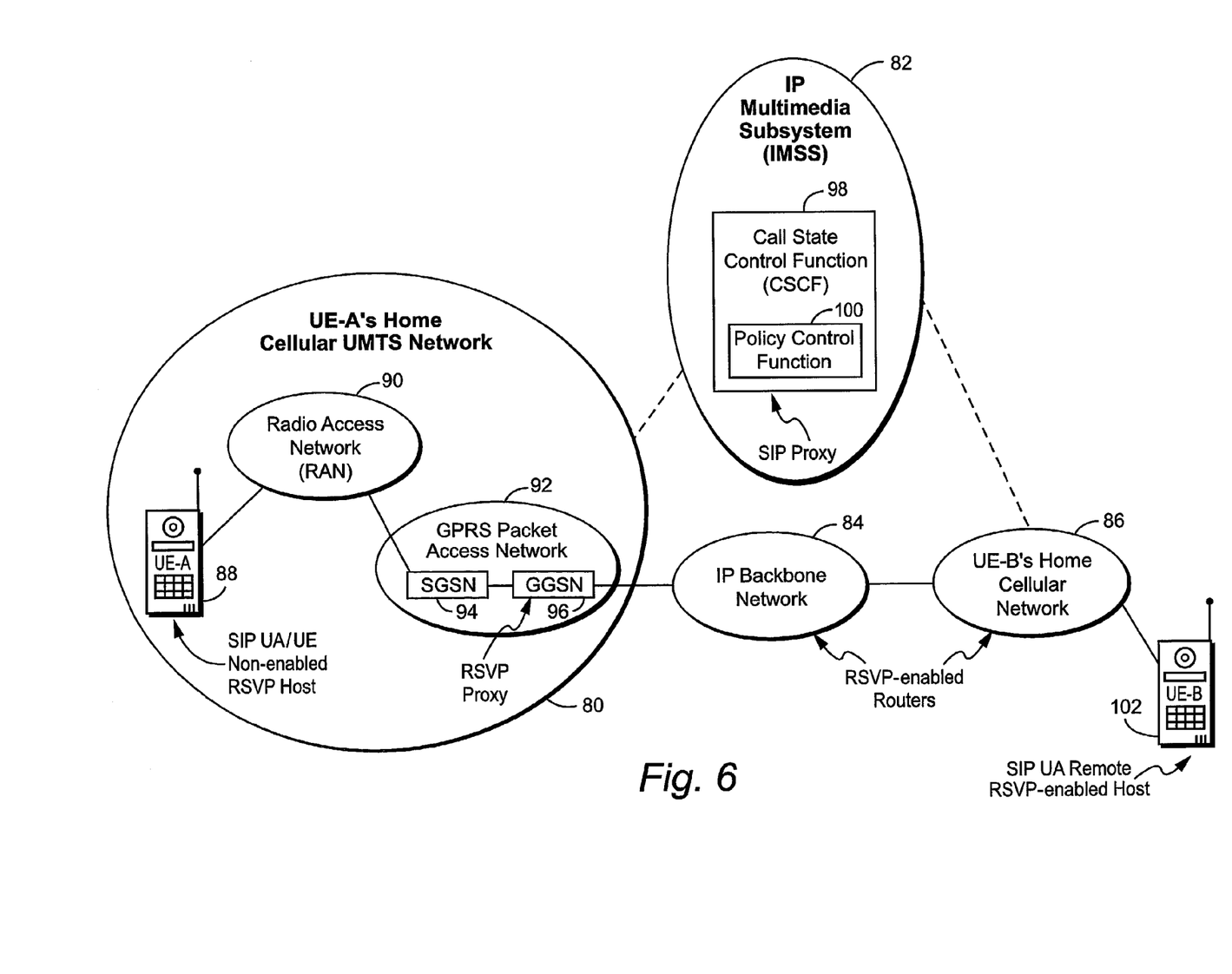
FIG. 6 illustrates a GPRS/UMTS-based communication system for conducting multimedia sessions in which the present invention may be employed.

Referring to FIG. 6, another non-limiting, example application of the invention will now be described in the context of a multimedia session set up via a General Packet Radio Service (GPRS)/Universal Mobile Telecommunication System (UMTS)-based access network 80. The packet access bearer service provided over a GPRS/UMTS network 80 must deliver the required end-to-end bearer service including supporting a quality of service requested for that bearer.

The GPRS/UMTS network 80 includes a set of network elements between the local host, corresponding to the Mobile Terminal (MT) 88, and an external packet switching network the user is connecting to like the Internet. The radio access network (RAN) 90 provides access over the radio interface to/from the MT and includes radio base stations and radio network controllers. The RAN 90 is coupled to a GPRS packet access network 92 that includes a supporting Gateway GPRS Support Node (SGSN) 94 and a Gateway GPRS Support Node (GGSN) 96. The GGSN 96 provides interworking between the GPRS/UMTS network and the IP backbone network 84. The coupling (shown as a solid line) between the GPRS/UMTS network 80 and the IP backbone network 84 is used to transport user data IP packets.

The GPRS/UMTS-type network 80 is coupled to an IP multimedia X subsystem (IMSS) 82. Communication with the IMSS 82 (shown as dashed lines) permits exchange of multimedia session control related messages. The IMSS 82 is typically a part of (although it may be separate from and coupled to) an P backbone network 84. The remote host corresponding to user equipment (UE-B) 102 is coupled to the IP backbone network 84 through its home cellular network 86, and by signaling connection, to the IMSS 82.

The mobile terminal 88 corresponding to UE-A 88 desires to establish a multimedia session with UE-B 102. The packet traffic for this session follows the solid line couplings between the various nodes. The session is established and managed using Session Initiation Protocol (SIP), and therefore, the user equipments 88 and 102 correspond to SIP User Agents (SIP UA). The P multimedia system 82 includes a Call State Control Function (CSCF) 98, and a Policy Control Function (PCF) 100. CSCF 98 and PCF 100 may be implemented on the same or different servers. The Call State Control Function 98 functions as a SIP proxy for the SIP user agent UE-A 88.

Before the mobile terminal can send packet data to the remote host, the mobile terminal must "attach" to the GPRS network to make its presence known and to create a packet data protocol (PDP) context to establish a relationship with a GGSN. The PDP attach procedure is carried out between the mobile terminal and the SGSN to establish a logical link. As a result, a temporary logical link identity is assigned to the mobile terminal. A PDP context is established between the mobile terminal and a GGSN selected based on the name of the external network to be reached. One or more application flows (sometimes called "routing contexts") may be established over a single PDP context through negotiations with the GGSN. An application flow corresponds to a stream of data packets distinguishable as being associated with a particular host application. An example application flow is in an electronic mail message from the mobile host to a fixed terminal. Another example application flow is a link to a particular Internet Service Provider (ISP) to download a graphics file from a website. Both of these application flows are associated with the same mobile host and the same PDP context. User data is transferred transparently between the MS and the external data networks with a method known as encapsulation and tunneling.

As explained earlier, QoS is a means for providing end users with satisfying service. It also enables efficient use of the radio resources. QoS can be characterized by several performance criteria such as throughput, connection setup time, percentage of successful transmissions, speed of fault detection and correction, etc. In an IP network, QoS can be measured in terms of bandwidth, packet loss, delay, and jitter. For a multimedia session between the mobile terminal and the remote host, the QoS must be end-to-end and must have the support of all nodes in the end-to-end path.

One way of ensuring such end-to-end QoS is to use the Resource Reservation Protocol (RSVP) which specifies resource reservation techniques for IP networks. RSVP is a protocol that enables resources to be reserved for a session prior to any attempt to exchange media between the MT and the remote host. There are other resource reservation/assurance techniques and protocols, and the present invention can be used with these as well. However, for purposes of explanation, the following example embodiment is described in the context of RSVP.

In RSVP, a sender first issues a PATH message to the remote receiver via a number of routers. The PATH message contains a traffic specification (Tspec) that provides details about the data that the sender expects to send in terms of bandwidth requirement and packet size. Each RSVP-enabled router along the way establishes a path state that includes the previous source address of the PATH message (i.e., the next hop back towards the sender). The receiver of the PATH message responds with a Reservation Request (RESV) that includes a flowspec. The flowspec includes a Tspec and information about the type of reservation service requested. These are the primary RSVP messages handled by the RSVP proxy, but the proxy preferably handles any other RSVP messages, e.g., RSVP RESVcont, as well.

A problem with the multimedia session being established between the mobile terminal 88 and the remote host 102 in FIG. 6 is that the mobile terminal 88 is a non-enabled RSVP host. However, the rest of the IP routers in the path to the RSVP-enabled remote host 102 support RSVP. Thus, in order to use RSVP to reserve resources end-to-end for this session, the mobile terminal 88 needs an RSVP proxy. In this case, the GGSN 96 is chosen to perform that proxy role. The next step is to let the GGSN 96 know that the mobile terminal 88 needs the GGSN to be the mobile's RSVP proxy for this session. This information is communicated to the GGSN 96 when one or more Packet Data Protocol (PDP) contexts is being established for the session.

Within a GPRS/UMTS access network, radio network resources are managed on a per PDP context level, which corresponds to one or more user flow/data streams and a certain QoS class. A PDP context is implemented as a dynamic table of data entries, comprising all needed information for transferring PDP data units between the mobile terminal and the GGSN, e.g., addressing information, flow control variables, QoS profile, charging information, etc. The relationship between a packet access bearer and a PDP context is a one-to-one mapping. The PDP context signaling carries the requested and negotiated QoS profile between the nodes in the UMTS network. It has a central role for QoS handling in terms of admission control, negotiation, and modifying of bearers on a QoS level.

Figure 7:
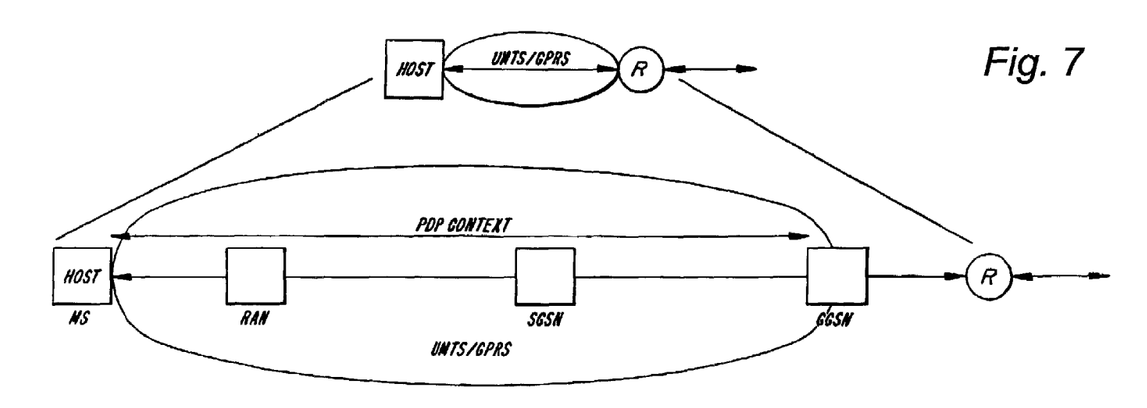
FIG. 7 is a block diagram illustrating a PDP context in the system shown in FIG. 6.

A PDP context is shown in FIG. 7. Briefly, the MT sends a PDP message, e.g., "Activate PDP context request," to the SGSN which includes a requested QoS profile. The SGSN sends "RAB Assignment Request" to the RNC in the RAN to establish a radio access bearer (RAB) service to carry the RAB QoS attributes. From the RAB QoS attributes, the RNC determines the radio-related parameters corresponding to the QoS profile, e.g., transport format set, transport format combination set, etc. The RNC sends a "Radio Bearer Set-up" message to the MT. The RAN and the MT are ready to transfer traffic, and a "RAB Assignment Complete" message is sent to the SGSN.

The SGSN sends a "Create PDP Context Request" to the GGSN carrying the QoS profile. Based on this profile, an admission control is performed at the GGSN level, and the GGSN may restrict the QoS if, for example, the system is overloaded. The GGSN stores the PDP context in a database. The GGSN returns the negotiated QoS to the SGSN in a "Create PDP Context Response" message and the SGSN stores the PDP context in its database. The negotiated QoS is sent from the SGSN to the MS in an "Activate PDP Context Accept" message. If either the SGSN or the GGSN has modified the QoS profile, then the MS has to either accept or reject this profile.

Figure 8:
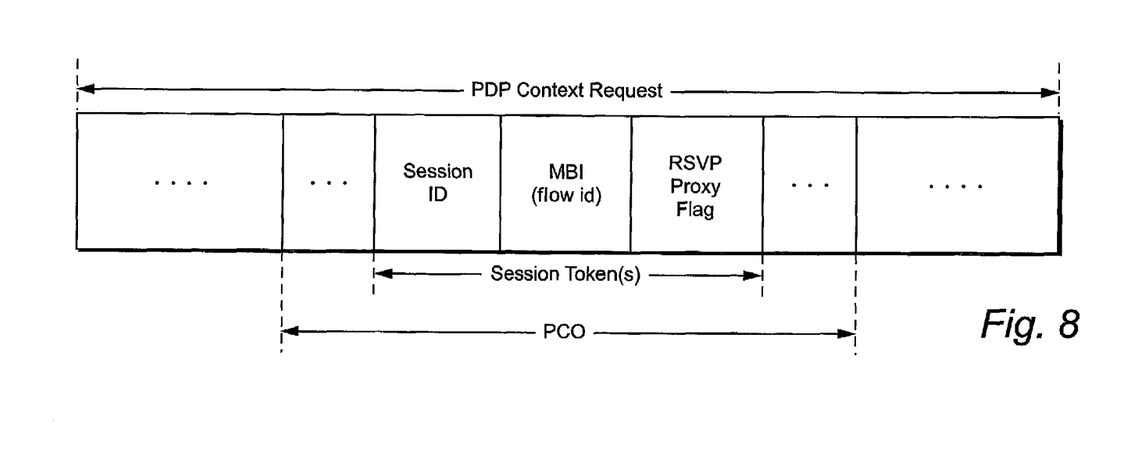
FIG. 8 illustrates a portion of a PDP context request message carrying an RSVP proxy flag.

The mobile terminal 88 can indicate to the GGSN 96 its need for an RSVP proxy in PDP context request either in activating/creating a new PDP context or modifying/updating an existing one. A single bit field can be included in the PDP context request called the RSVP proxy flag or indicator. If the flag is set, the MT requests the GGSN to be its RSVP proxy. If the flag is not set, the GGSN need not be its RSVP proxy. In one non-limiting example, the RSVP proxy flag field may be incorporated as a PDP Configuration Options (PCO) parameter in the PDP context request message. Preferably, (although not necessarily), the RSVP proxy flag field is included as a PCO along with one or more "tokens" associated with the session. FIG. 8 shows a partial PCO in a partial PDP context request message. The PCO includes three example tokens: a session identifier (ID), which can be used as an authorization token, a media binding indicator (MBI), which is a token that identifies a media flow within the session, and the RSVP proxy flag field/token. Further information regarding session IDs, MBIs, and other session-related tokens may be found in several of the commonly-assigned, related applications listed above, the disclosures of which are incorporated herein by reference.

Figure 9:
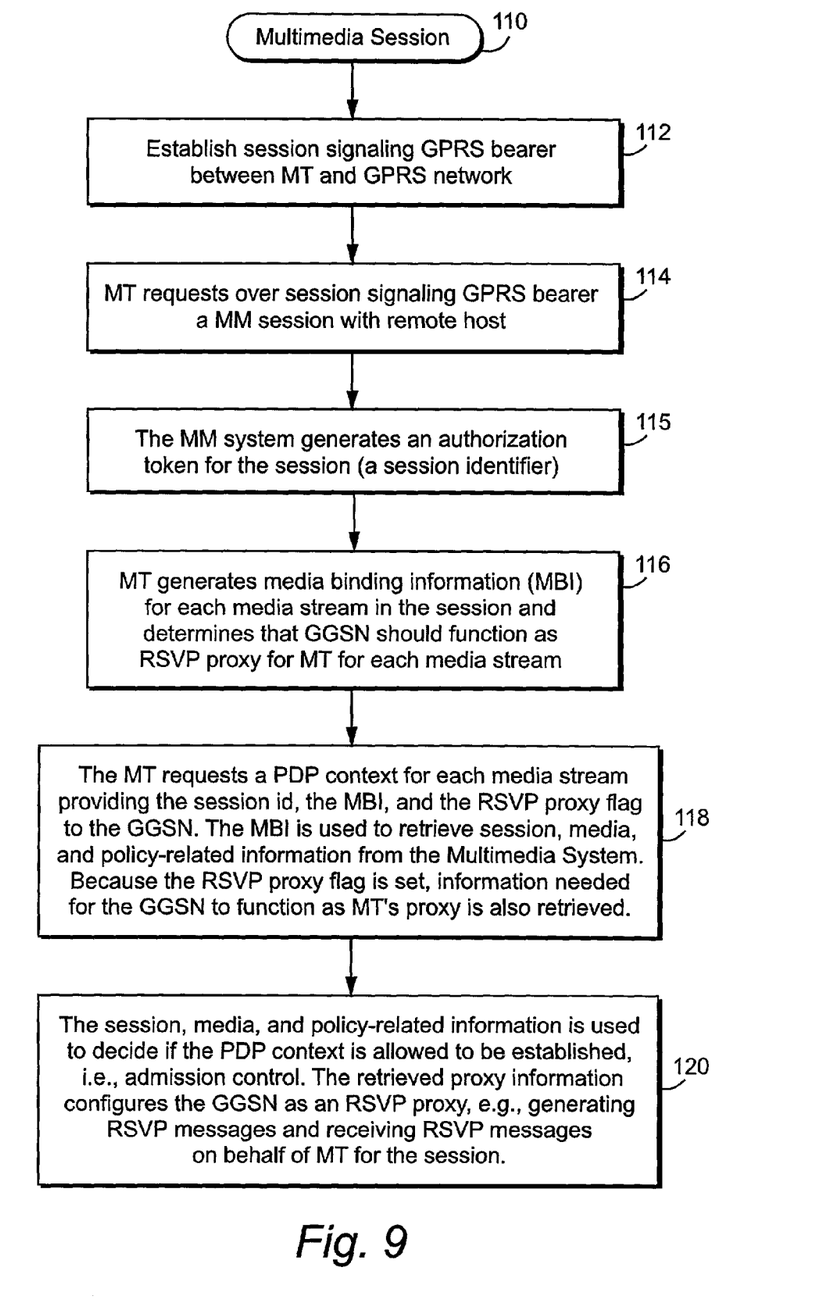
FIG. 9 is a flowchart illustrating example procedures for establishing a multimedia session in the system shown in FIG. 6 where the present invention is used.

Reference is now made to the Multimedia Session routine (block 110) in FIG. 9 which outlines in flowchart form example procedures for establishing a multimedia session between the MT (UE-A) and the remote host (UE-B). In particular, the MT (UE-A) requests that the GGSN function as its RSVP proxy using the PDP context request message format show in FIG. 9. A session signaling GPRS bearer is established between UE-A and the GPRS network 92 using well-established GPRS PDP context activation messages. This session signaling GPRS bearer corresponds to a first or primary PDP context (block 112). UE-A requests a multimedia session with the SIP UA remote UE-B over the session signaling GPRS bearer via the RAN 90, the GPRS network 92, the IP multimedia subsystem 82, the IP backbone network 84, and UE-B's home cellular network 86 (block 114). This request may be in the form of an SIP/SDP message sequence which contains sufficient information about the session, such as the source (UE-A) and destination (UE-B) end points, bandwidth requirements, and the characteristics of the media exchange, etc. to trigger an authorization of QoS resources procedure in the Call State Control Function 98.

The Policy Control Function 100 authorizes, if appropriate, the required quality of service resources for the session and installs an IP bearer level policy for the session and each media flow based on the information from the Call State Control Function 98. In addition, the Policy Control Function 100 generates an authorization "token" for the session corresponding to a session identifier. When the multimedia session is authorized and the policy control function 100 stores session information for each of the media flows in the session, the mobile terminal generates media binding information (BMI) for each media data stream in the session. The mobile terminal determines that the GGSN should function as its RSVP proxy for selected media data streams in the session (block 116).

The mobile terminal requests a PDP context for each media stream and includes the session id, the MBI, and the RSVP proxy indicator to the GGSN in the PDP context request message as a PCO. The MBI is used to retrieve session, media, and policy related information from the multimedia system. Because the RSVP proxy flag is set, information needed for the GGSN to function as the RSVP proxy is also retrieved from the multimedia system (block 118). The session, media, and policy related information is used to decide if the PDP context is allowed to be established (admission control). The retrieved proxy information configures the GGSN as an RSVP proxy, e.g., generating RSVP PATH messages and receiving RSVP RESV messages on behalf of the mobile terminal for the session (block 120).

Figure 10:
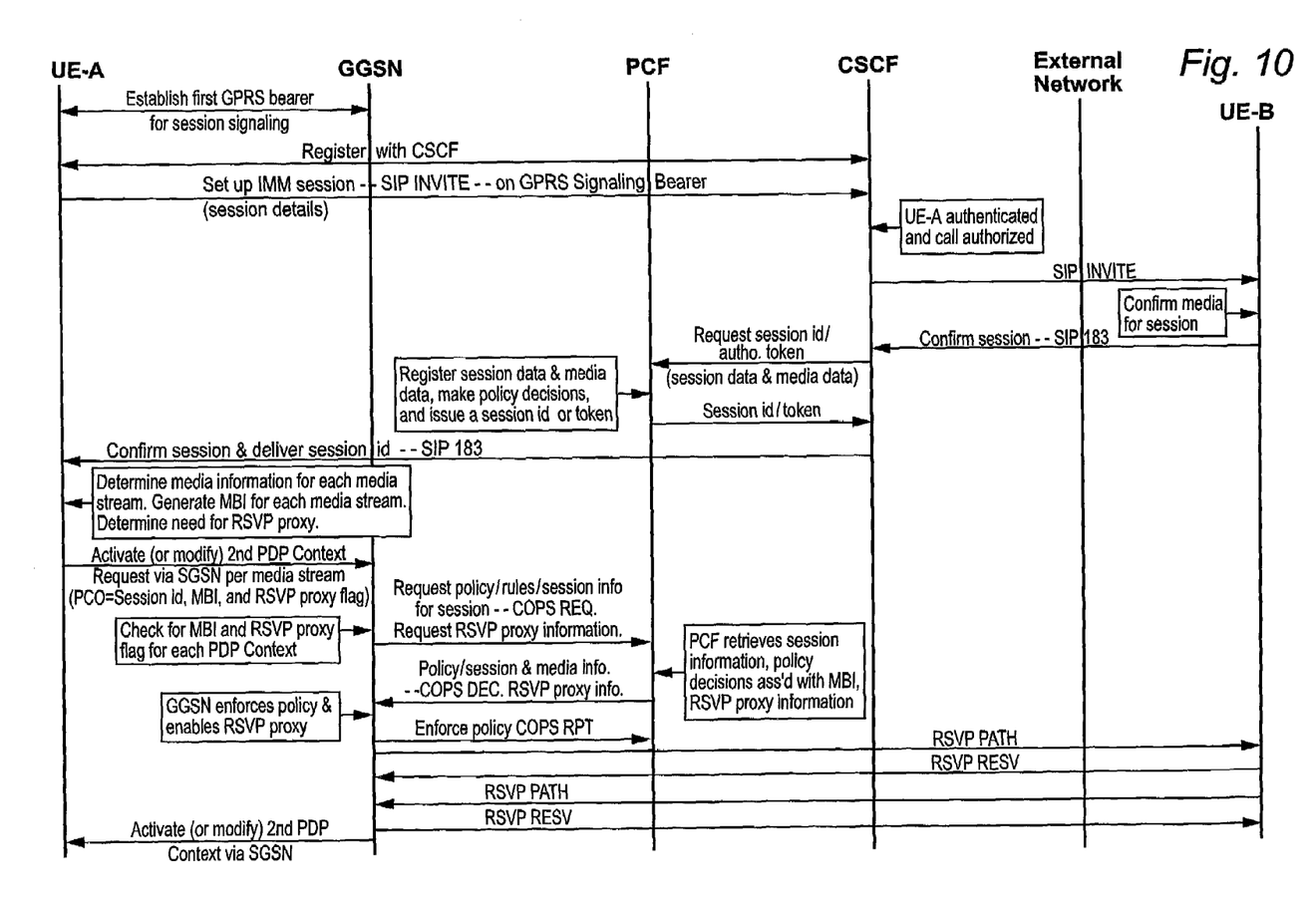
FIG. 10 is an example signaling diagram of multimedia session message exchanges related to the procedures shown in FIG. 9.

An example signaling flow diagram for the example multimedia session between the mobile terminal local host UE-A and remote host UE-B is shown in FIG. 10 and now described. Initially, UE-A establishes a first PDP context with the GGSN to establish a GPRS bearer for session signaling needed to establish the multimedia session. The UE-A then registers with the CSCF before sending a SIP INVITE message on the GPRS signaling bearer to the CSCF to setup the IP multimedia session. The INVITE message includes the session details regarding the number of media flows and requested corresponding quality of service. The CSCF authenticates the UE-A as a subscriber and authorizes the session. The SIP INVITE message is forwarded to UE-B via external networks. UE-B confirms the session request in a SIP "183" message returned to the CSCF. The SIP 183 is an acknowledgement message to the SIP INVITE message.

The CSCF requests from the PCF a session identifier (ID) for the session and communicates session-related and media-related data to the PCF. The session ID corresponds to an authentication token. The PCF registers the session-related data and the media-related data, makes policy decisions for the session, issues the session ID (authorization token), and returns it to the CSCF. The CSCF confirms the session, and delivers the session ID in a SIP 183 message to the UE-A.

The UE-A determines media information from each media stream, and generates media binding information (MBI) for each media stream using the session ID and the media information. Alternatively, the UE-A may receive the MBI from the CSCF in the SIP 183 message or from another entity. Still further, the UE-A may create the MBI using some other procedure that does not employ the session ID. In addition, the UE-A determines its need for an RSVP proxy. The UE-A activates a second PDP context (i.e., by sending a secondary PDP context request message to the SGSN) for each media stream and includes in the PCO the session id, the MBI, and sets the RSVP proxy flag.

The GGSN checks the PCO and detects the session id, the MBI, and the RSVP proxy flag. The GGSN uses the MBI as an identifier for each media stream and requests the policy/rules for the session and media stream in a Common Open Policy Service Protocol (COPS) REQ message. RSVP proxy information is also requested. In response, the PCF retrieves the session information and policy decisions associated with the MBI for each media stream and returns the policy rules and other session-related and media-related information to the GGSN in a COPS DEC message. The PCF also provides RSVP proxy information to be installed in the GGSN. Using the obtained rules and information, the GGSN enforces the policy and installs the RSVP proxy information. It acknowledges the request for each secondary PDP context. The GGSN responds with a COPS RPT message.

Thereafter, the GGSN is enabled as an RSVP proxy for the UE-A, generating and terminating RSVP signaling for each media stream to/from UE-B. As an RSVP proxy, the GGSN generates an RSVP PATH message for each media data stream to UE-B, which is then confirmed by an RSVP RESV message from the UE-B. This is done for the establishment of the RSVP flow from the GGSN to the UE-B. The GGSN RSVP proxy responds to each RSVP PATH message from UE-B with an RSVP RESV message. This is done to establish the RSVP flow from the UE-B to the GGSN. Two RSVP flows are established for each bidirectional media data stream for which GGSN has established the RSVP proxy function.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method implemented in a mobile terminal for use in setting up a multimedia session between the mobile terminal and a remote host by way of an access point coupled to a packet data network, comprising:

determining a need for a communications protocol proxy for the mobile terminal for the multimedia session, sending a request message associated with the multimedia session to the access point requesting a packet access bearer between the mobile terminal and the access point, and setting an indicator in the request message indicating that the access point should function as a communications protocol proxy for the mobile terminal for a media data stream of the multimedia session, wherein:

the communications protocol is used to reserve communication resources for the media data stream of the multimedia session, the communications protocol is the resource reservation protocol (RSVP), and the communications protocol proxy is an RSVP proxy for the mobile terminal during the multimedia session, the request message is a Packet Data Protocol (PDP) context request message and the indicator is an RSVP proxy flag, and the PDP context request message includes the RSVP proxy flag as a PDP configuration option (PCO).

2. The method in claim 1, wherein the request message indicates a particular quality of service associated with the packet access bearer.

3. The method in claim 1, wherein the mobile terminal is a user equipment that communicates with a General Packet Radio Service (GPRS) access network by way of a Universal Mobile Telecommunication Services (UMTS) Terrestrial Radio Access Network (UTRAN), and wherein the access point is a Gateway GPRS Service Node (GGSN).

4. A method implemented in an access point coupled to a packet data network for use in setting up a multimedia session between a mobile terminal and a remote host, comprising:

receiving from the mobile terminal a request message for a packet access bearer between the mobile terminal and the access point for the multimedia session;

detecting an indicator in the request message indicating that the access point should function as a communications protocol proxy for the mobile terminal for a media data stream of the multimedia session; and performing as the communications protocol proxy for the mobile terminal for the media data stream of the multimedia session, wherein the communications protocol is the resource reservation protocol (RSVP), and the communications protocol proxy is an RSVP proxy for the mobile terminal during the multimedia session, and wherein the request message is a packet data protocol (PDP) context request message and the indicator is an RSVP proxy flag.

5. The method in claim 4, wherein the request message indicates a particular quality of service associated with the packet access bearer.

6. The method in claim 4, wherein the RSVP proxy is a PDP configuration option (PCO).

7. The method in claim 4, further comprising:

when the indicator is set, installing an RSVP proxy state process for the media data stream of the multimedia session in the access point from a multimedia server.

8. The method in claim 7, wherein when the RSVP proxy state process for the multimedia session is installed in the access point, the access point generates an RSVP PATH message directed to the remote host and in response thereto receives an RSVP RESV message from the remote host on behalf of the mobile terminal, the access point storing information received in the RSVP RESV message from the remote host.

9. The method in claim 7, wherein the access point retrieves authorization information for the media data stream of the multimedia session from a multimedia server.

10. The method in claim 7, wherein the access point retrieves quality of service information for the media data stream of the multimedia session and uses the retrieved quality of service information to generate and respond to RSVP messages on behalf of the mobile terminal.

11. The method in claim 4, wherein the mobile terminal is a user equipment that communicates with a General Packet Radio Service (GPRS) access network by way of a Universal Mobile Telecommunication Services (UMTS) terrestrial radio access network (UTRAN), and wherein the access point is a gateway GPRS service node (GGSN).

12. A mobile terminal comprising electronic circuitry capable of communicating with an access point coupled to a packet data network by way of a radio access network and being configured to perform the following tasks:
    determine a need for a communications protocol proxy for the mobile terminal for the multimedia session,
    send a request message associated with the multimedia session to the access point requesting a packet access bearer between the mobile terminal and the access point, and
    set an indicator in the request message indicating that the access point should function as a communications protocol proxy for the mobile terminal for the media data stream of the multimedia session,
    wherein the communications protocol is the resource reservation protocol (RSVP), and the communications protocol proxy is an RSVP proxy for the mobile terminal for the media data stream during the multimedia session, and
    wherein the request message is a Packet Data Protocol (PDP) context request message and the indicator is an RSVP proxy flag.

13. The mobile terminal in claim 12, wherein the request message indicates a particular quality of service for the packet access bearer.

14. The mobile terminal in claim 12, wherein the PDP context request message includes the RSVP proxy flag as a PDP configuration option (PCO).

15. The mobile terminal in claim 12, wherein the mobile terminal is a user equipment that communicates with a General Packet Radio Service (GPRS) access network by way of a Universal Mobile Telecommunication Services (UMTS) Terrestrial Radio Access Network (UTRAN), and wherein the access point is a gateway GPRS service node (GGSN).

16. An access point capable of communicating with a packet data network for use in setting up a multimedia session between a mobile terminal and a remote host, comprising electronic circuitry configured to perform the following tasks:
    receive from the mobile terminal a request message for a packet access bearer between the mobile terminal and the access point for the multimedia session;
    detect an indicator in the request message indicating that the access point should function as a communications protocol proxy for the media data stream of the mobile terminal for the multimedia session; and
    perform as the communications protocol proxy for the media data stream of the mobile terminal for the multimedia session, wherein:
    the communications protocol is used to reserve communication resources for the media data stream of the multimedia session,
    the communications protocol is the resource reservation protocol (RSVP), and the communications protocol proxy is an RSVP proxy for the mobile terminal for the media data stream during the multimedia session, and
    the request message is a packet data protocol (PDP) context request message and the indicator is an RSVP proxy flag.

17. The access point in claim 16, wherein the request message indicates a particular quality of service for the packet access bearer.

18. The access point in claim 16, wherein the RSVP proxy is a PDP configuration option (PCO).

19. The access point in claim 16, further comprising:
    when the indicator is set, installing an RSVP proxy state process for the media data stream of the multimedia session in the access point from a multimedia server.

20. The access point in claim 19, wherein when the RSVP proxy state process for the media data stream of the multimedia session is installed in the access point, the access point generates an RSVP PATH message directed to the remote host and in response thereto receives an RSVP RESV message from the remote host on behalf of the mobile terminal, the access point storing information received in the RSVP RESV message from the remote host.

21. The access point in claim 19, wherein the access point retrieves authorization information for the media data stream of the multimedia session from a multimedia server.

22. The access point in claim 19, wherein the access point retrieves quality of service information associated with the multimedia session and uses the retrieved quality of service information to generate and respond to RSVP messages on behalf of the mobile terminal.

23. The access point in claim 16, wherein the mobile terminal is a user equipment that communicates with a General Packet Radio Service (GPRS) access network by way of a Universal Mobile Telecommunication Services (UMTS) terrestrial radio access network (UTRAN), and wherein the access point is a gateway GPRS service node (GGSN).

24. A communications system, comprising:
    a mobile terminal configured to initiate a multimedia session with a remote host;
    a General Packet Radio Service (GPRS) network coupled to an Internet to which the remote host is coupled to through an access network including a gateway GPRS service node (GGSN);
    a access network by way of a Universal Mobile Telecommunication Services (UMTS) Terrestrial Radio Access Network (UTRAN) coupled to the GPRS network and communicating with the mobile terminal over a radio interface; wherein:
    the mobile terminal determines a need for a communications protocol proxy for the mobile terminal for the multimedia session,
    the mobile terminal sends a Packet Data Protocol (PDP) context request message associated with the multimedia session to the GGSN requesting a packet access bearer between the mobile terminal and the access point and sets an indicator in the PDP context request message indicating that the GGSN should function as a communications protocol proxy for the mobile terminal for the media data stream of the multimedia session,
    the GGSN receives the PDP context request message, detects the indicator, and performs as the communications protocol proxy for the mobile terminal for the media data stream of the multimedia session,
    the communications protocol is the resource reservation protocol (RSVP), and the GGSN is an RSVP proxy for the media data stream of the mobile terminal during the multimedia session.

25. The communications system in claim 24, wherein the request message indicates a particular quality of service for the packet access bearer.

26. The communications system in claim 24, further comprising a multimedia system server, wherein when the indicator is set, an RSVP proxy state process for the media data stream of the multimedia session is installed in the GGSN by the multimedia server.

27. The communications system in claim 26, wherein the GGSN RSVP proxy generates an RSVP PATH message directed to the remote host and receives an RSVP RESV message from the remote host on behalf of the mobile terminal, the GGSN storing information received in the RSVP RESV message from the remote host.

28. The communications system in claim 24, the RSVP proxy is a PDP configuration option (PCO).

* * * * *